United States Patent [19]

Moore

[11] Patent Number: 4,700,277
[45] Date of Patent: Oct. 13, 1987

[54] AUXILIARY VEHICLE LAMP

[76] Inventor: Dennis G. Moore, 2602 Superior, Livermore, Calif. 94550

[21] Appl. No.: 18,750

[22] Filed: Mar. 2, 1987

Related U.S. Application Data

[63] Continuation of Ser. No. 797,879, Nov. 14, 1985, abandoned.

[51] Int. Cl.⁴ .............................................. B60Q 1/00
[52] U.S. Cl. ...................................... 362/80; 340/87; 362/211; 362/368; 362/418
[58] Field of Search ................. 362/61, 285, 294, 311, 362/218, 373, 269, 80, 211, 212, 213; 340/69, 70, 71, 87, 97, 74, 122, 127, 144, 145, 135; 313/316, 418, 368, 372

[56] References Cited

U.S. PATENT DOCUMENTS

| | | | |
|---|---|---|---|
| 1,029,851 | 6/1912 | Carangelo | 313/316 |
| 1,500,998 | 7/1924 | Kuhn | 362/80 |
| 2,891,140 | 6/1959 | Huff | 340/74 |
| 3,432,808 | 3/1969 | Fleece | 340/87 |
| 3,800,430 | 4/1974 | Samra | 340/87 |
| 4,328,481 | 5/1982 | Sexton | 340/74 |
| 4,449,167 | 5/1984 | Cohen | 362/812 |
| 4,463,411 | 6/1984 | Proctor | 362/61 |
| 4,488,141 | 12/1984 | Ohlenforst et al. | 340/87 |

FOREIGN PATENT DOCUMENTS

| | | | |
|---|---|---|---|
| 1801176 | 4/1970 | Fed. Rep. of Germany | 362/80 |
| 3300383 | 11/1984 | Fed. Rep. of Germany | 362/373 |

Primary Examiner—William A. Cuchlinski, Jr.
Assistant Examiner—D. M. Cox
Attorney, Agent, or Firm—August E. Roehrig, Jr.

[57] ABSTRACT

There is provided an auxiliary lamp for use with a vehicle having a standardized enclosed body with a replaceable lens which may be interchanged with other lenses depending upon the function the lamp is to perform. The light bulb which illuminates the lamp is carried within the lamp housing by means of a standardized bulb holder insertable through the bottom of the housing, and forming a closure thereof preventing light from passing through the bottom opening of the housing through which the bulb holder is inserted. The bulb holder may be easily adapted to carry either a single or double filament bulb depending upon the particular function the lamp is to perform. However, the lamp housing and the holder in which the bulb is carried are constructed in the same manner, whether using a single or a double filament bulb, with appropriate electrical connections being provided on the bulb holder to accommodate the different bulbs as necessitated by the function the bulb filaments are to perform.

10 Claims, 7 Drawing Figures

U.S. Patent  Oct. 13, 1987  4,700,277
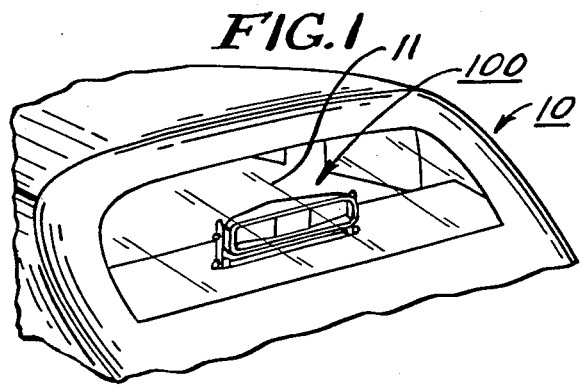
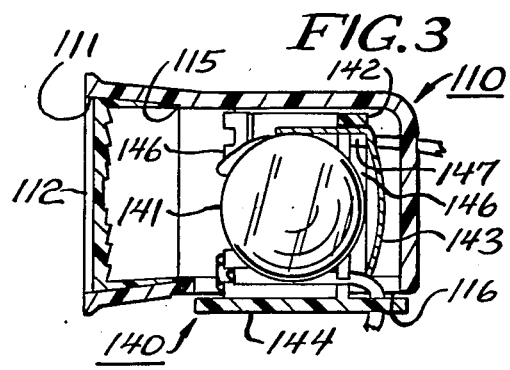
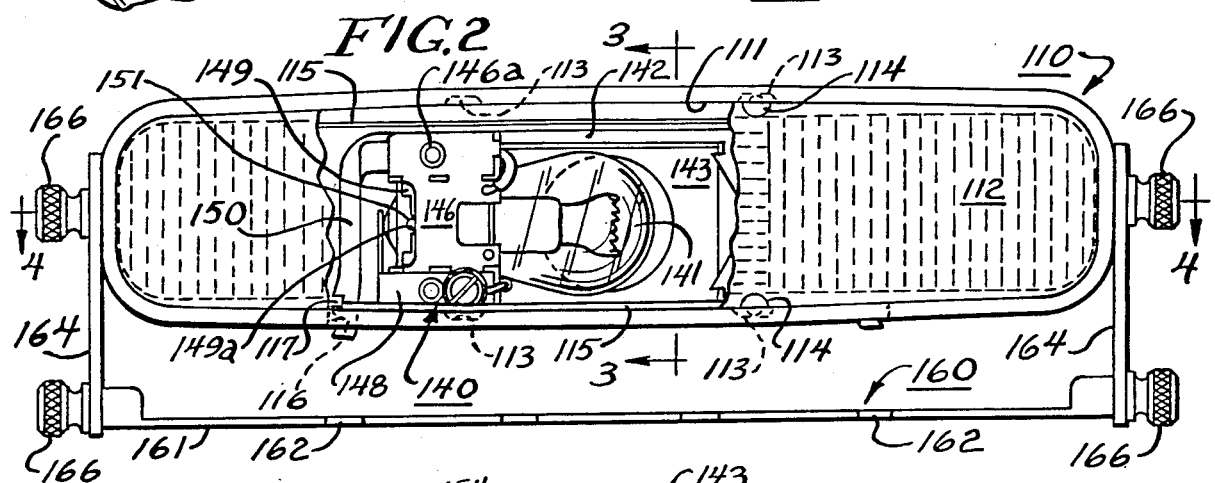
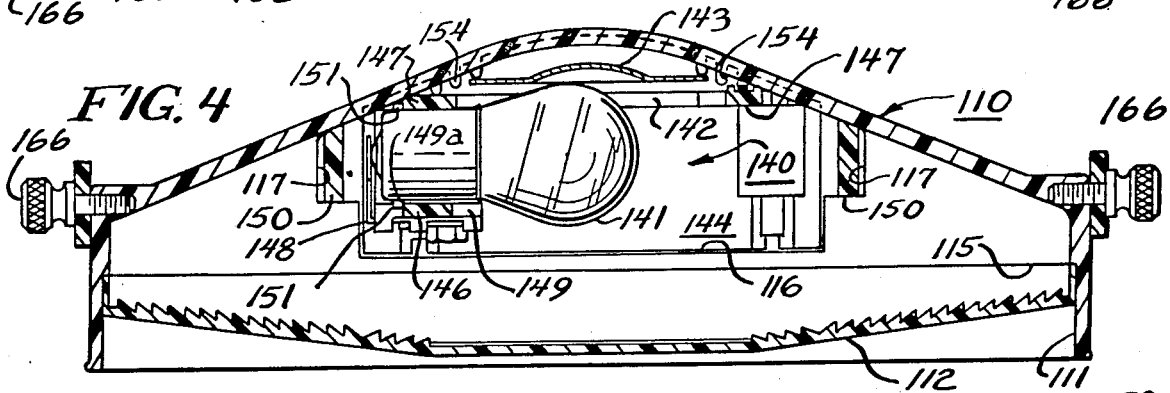
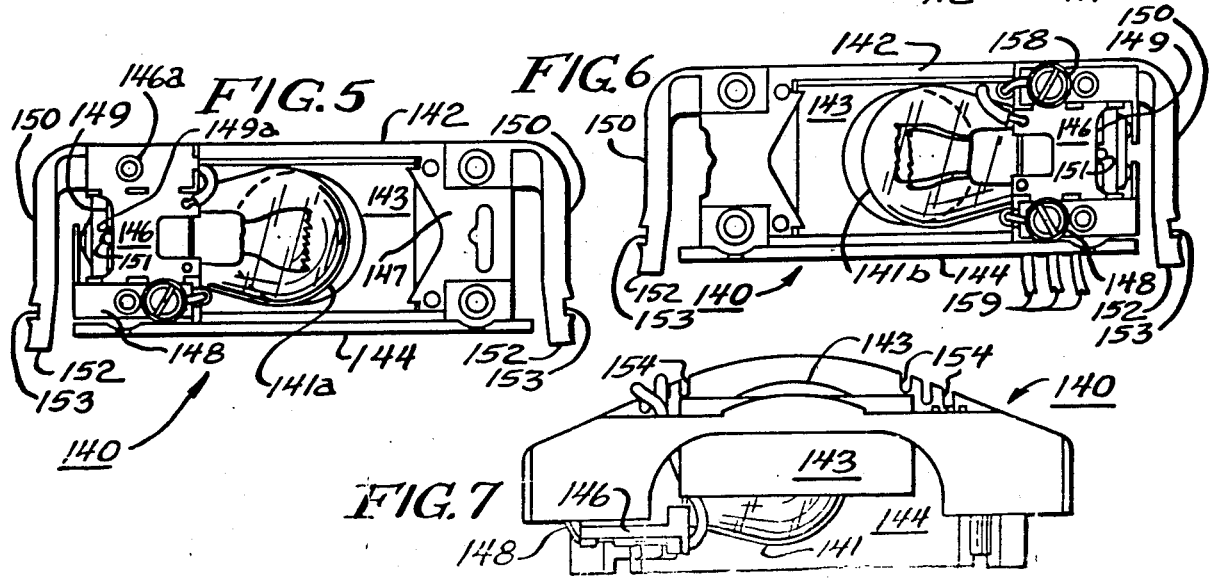

AUXILIARY VEHICLE LAMP

This is a continuation of application Ser. No. 797,879, filed Nov. 14, 1985 now abandoned.

BACKGROUND OF THE INVENTION

This invention relates to vehicle lamps and, in particular, to an auxiliary vehicle lamp selectively mountable in various positions for performing various lighting functions. More specifically, but without restrictions to the particular embodiments and/or use which are shown and described for purposes of illustration, this invention relates to an auxiliary lamp for a vehicle which may be permanently mounted to provide a high-center-mount brake light and/or turn signal light, or temporarily affixed in a desired position to perform such functions as a temporary brake, tail or turn light; a high-center-mount brake and/or turn signal light or a convenience light, as desired.

Beginning with the 1986 model year, new automobiles are required to have a high-center-mount brake light to provide a braking signal at a position more conveniently seen by the drivers of following vehicles, especially in slow moving heavy traffic. A four-year testing program conducted by the National Highway Traffic Safety Administration resulted in a finding that the use of such a high-center-mount brake lamp reduced rear-end accidents by 52%. While such auxiliary vehicle lamps will be incorporated in new automobiles beginning with the 1986 model year, it would be highly desirable to provide this same auxiliary lighting for cars manufactured prior to that time. In this manner, older vehicles can have the same benefit from these accident preventing features as found by the National Highway Traffic Safety Administration.

To this end, the present invention is an auxiliary lamp for a vehicle which may be mounted in a high-center position to provide such a braking signal. The lamp is constructed in such a manner as to be conveniently mountable in many types of vehicles, regardless of the particular configuration of the vehicle rear window. In addition, the invention may be temporarily mounted, and includes wiring to provide a coupling from a towing vehicle to a vehicle being towed. The invention is especially suitable for providing an auxiliary light at a location removed from a source of electrical power, and can be conveniently mounted in a temporary location for such things as an emergency vehicle flasher light, an insect repellent light for use on a recreational vehicle or for marine use, or as an attachment on an extended load to provide a long-load warning light.

In each of these above described usages, the lamp is performing either a safety or a convenience function. Accordingly, one of the features of this invention is the ease with which a bulb may be replaced in the lamp which eliminates the necessity of any tools in order to replace a burnt-out bulb. Furthermore, the invention eliminates the necessity of any screws or metal fasteners for holding the lamp body together, or which must be removed in order to replace a burnt-out bulb as in most vehicle lamps. Vehicle lamps constructed in accordance with the inventor's prior patents, U.S. Pat. Nos. 3,858,039; 4,281,367 and 4,506,314 each utilize a mounting structure for the light bulb which eliminates the necessity of removing screws in order to disassemble the lamp when replacing a burnt-out bulb. The present invention also utilizes a structure which permits the bulb to be removed from the lamp housing without disassembling the lamp housing, or requiring the use of a fastening device such as metal screws which frequently corrode making their removal inconvenient at best. In addition, the bulb holder is standardized to be used with either a single or double filament light bulb by merely changing electrical couplings. In this manner the light may be used for different lighting functions by accommodating either type of bulb.

SUMMARY OF THE INVENTION

It is, therefore, an object of the invention to improve auxiliary lamps for vehicles.

Another object of this invention is to improve auxiliary vehicle lamps by providing quick and convenient access to the lamp bulb without necessitating disassembly of the lamp in order to replace a burnt-out bulb.

A further object of this invention is to provide a universally mountable auxiliary lamp for a vehicle which can be readily mounted to function as a high-center-mount brake light or as an auxiliary lamp which may be temporarily affixed at a location removed from the vehicle and/or an electrical power source.

Yet another object of this invention is to standardize the lamp body and bulb holder, but accommodate a single or double filament bulb for increasing the lamp versatility.

These and other objects are attained in accordance with the present invention wherein there is provided an auxiliary lamp for use with a vehicle having a standardized enclosed by with a replaceable lens which may be interchanged with other lenses depending upon the function the lamp is to perform. The light bulb which illuminates the lamp is carried within the lamp housing by means of a standardized bulb holder insertable through the bottom of the housing, and forming a closure thereof preventing light from passing through the bottom opening of the housing through which the bulb holder is inserted. The bulb holder may be easily adapted to carry either a single or a double filament bulb depending upon the particular function the lamp is to perform. However, the lamp housing and the holder in which the bulb is carried are constructed in the same manner, whether using a single or a double filament bulb, with appropriate electrical connections being provided on the bulb holder to accommodate the different bulbs as necessitated by the function the bulb filaments are to perform.

DESCRIPTION OF THE DRAWINGS

Further objects of the invention, together with additional features contributing thereto and advantages accruing therefrom will be apparent from the following description of a preferred embodiment of the invention which is shown in the accompanying drawings with like reference numerals indicating corresponding parts throughout, wherein:

FIG. 1 is a perspective view of the rear portion of a vehicle illustrating the manner in which the auxiliary light is mounted to perform the function of a high-center-mount brake light;

FIG. 2 is a frontal view of a lamp such as shown in FIG. 1 with portions removed to better illustrate the internal components thereof;

FIG. 3 is a sectional view of the lamp shown in FIG. 2 taken along lines 3—3;

FIG. 4 is a cross-sectional view of the lamp shown in FIG. 2 taken along lines 4—4;

FIG. 5 is a frontal view of the bulb holder utilized in the vehicle lamp illustrated in FIGS. 1–4 accommodating a single filament bulb;

FIG. 6 is a frontal view of the bulb holder illustrated in FIG. 5 accommodating a double filament bulb; and FIG. 7 is a top view of the bulb holders shown in FIGS. 5 and 6.

DESCRIPTION OF THE PREFERRED EMBODIMENTS

Referring now to the drawings, there is illustrated in FIG. 1 a vehicle 10 having a rear window 11 in which is mounted an auxiliary vehicle lamp 100 which is the subject matter of the instant invention. The auxiliary lamp 100, best illustrated in FIGS. 2–7, comprises three major portions, a lamp body 110, a light-bulb holder 140 and a mounting base 160.

The lamp body or housing 110 is formed as a unitary enclosure with an opening 111 in the forward portion thereof into which a lens 112 may be releasably secured. In this manner, the lens 112 may be replaced or interchanged to provide, for example, either a red, amber, or other color light as desired. To this end, the forward portion of the lamp housing 110 is formed with a pair of recesses 113 in both the upper and lower portions thereof. These recesses 113 are for receiving a complementary pair of protrusions 114 formed on outer portions of the lens 112. When the lens 112 is inserted through the forward opening 111 in the lamp housing 110, for example to interchange the color of the light output in accordance with the function the lamp is to perform, the protrusions 114 engage the recesses 113 to hold the lens 112 in proper position. A lip 115 is formed in the interior of the lamp housing 110, about the upper, lower and both side portions thereof, and functions to limit the inward positioning of the lens 112 when placed within the frontal opening 111. The stop thus formed is engaged by the rearward portion of the lens 112 to assist in ensuring proper lens positioning.

As best shown in FIGS. 2–4, the lamp body or housing 110 is also formed with an opening 116 in the bottom or base portion thereof through which the bulb holder 140 may be inserted and releasably retained therein. In this manner, whenever it is necessary to change or replace a burnt-out light bulb 141, the bulb holder 140 may be readily removed from the lamp body or housing 110. The bulb 141 can thereby be replaced without necessitating the use of any tools, such as required in lamps utilizing screws or metal fastening devices to hold the lamp in an assembled configuration.

The bulb holder 140, best shown in FIGS. 5–7, includes an open frame portion 142 having mounted therein a centralized reflector 143 which is centrally positioned in the opening of frame portion 142 adjacent to a light bulb 141 carried by the bulb holder 140 to reflect any light directed towards the rear of the lamp housing 110 outwardly through the forward lens 112. A base portion 144 is joined to the frame portion 142 and in cooperation therewith retains the light bulb 141 in an appropriate position and couples thereto appropriate electrical connections so that either a single or a double filament bulb, 141a and 141b, respectively, can be utilized in the same bulb holder 140.

Referring now to FIG. 5, the lamp 141a illustrated therein is a single filament lamp. The base of the lamp 141a is positioned between a boss plate 146 carried on the frame and base portions 142 and 144, respectively, and one of the sides 147 of the frame 142. The filaments of the light bulb 141a are positioned adjacent to the reflector 143 centrally positioned within the opening of the frame portion. An electrical contact 148 is secured to the boss plate 146 by means of a suitable connector, such as a machine screw, with the conductor 148 contacting the base of the single filament lamp 141a to form one contact for coupling the lamp 141a into an illuminating circuit. A second electrical contact 149 is provided by a second conductor supported from the boss plate 146 at the upper left hand corner 146a thereof. This conductor 149 is formed with a notch 149a therein which functions in cooperation with a similar notch (not shown) formed on the rear portion of the frame 142 to receive the bayonets 151 of the bulb 141a to ensure that the bulb is positioned in proper electrical and photometric positioning.

In order to releasably secure the bulb holder 140 within the lamp body or housing 110, a pair of cantilevered tabs 150 extend from the upper portion of the frame member 142 downwardly therefrom to a terminal end 152. The terminal end of each tab is formed with a groove 153 to receive the side edge portions 117 of the opening 116 formed in the bottom or base portion of the lamp housing or body 110. Upon movement of the two tab portions 150 towards each other, the lamp holder 140 may be inserted or removed through the opening in the lamp body or housing 110. After insertion, upon the subsequent release of the cantilevered tab portions 150, the tabs will exert an outward force against the edges 117 of the lamp body 110, by engaging the edge portions 117 in the grooves 153 formed in the tabs 150, thereby retaining the bulb holder 140 in engagement with the lamp body or housing 110. A plurality of wire openings 154 are provided on the rear edge of the base portion 144 of the bulb holder 140 through which appropriate electrical wires are inserted for coupling to the terminals of the lamp to complete the illuminating circuit from a suitable power source. While these openings are of sufficient size to permit the passage of electrical wires therethrough, the overall dimension of the base portion 144 relative to the opening 116 in the lamp body or housing 110 is such that substantially all light is blocked from passing through the bottom of the lamp body or housing 110 when the bulb holder 140 is inserted therein.

Referring now to the embodiment illustrated in FIG. 6, the bulb holder 140 is illustrated incorporating an additional electrical contact 158 to accommodate a double filament bulb 141b. However, the bulb holder 140 is constructed in the same manner as previously described except for the addition of this electrical contact and the repositioning of boss plate 146 and electrical contacts 148 and 149. In this embodiment, the base of the double filament bulb 141b is preferably supported from the right side of the bulb holder 140 between the right side 147 of the frame 142 and the boss plate 146 located on that same side. Due to the centralized positioning of the reflector 143 in the opening of the frame portion 142, the filaments of light bulb 141b will also be positioned adjacent to the reflector as was the filament of the lamp 141a. The lamp base electrical contact 148 is repositioned on the right side and carried by the boss plate 146 to electrically connect the other contact of the double filament bulb 141b. The third electrical contact is formed by repositioning contact 149 between the boss plate 146 and the base of bulb 141b. A three-wire connector 159 is coupled to contacts 148, 149 and 158 from an appropriate power source (not shown) to enable the double filament lamp 141b to perform the additional functions that such a double filament lamp provides. In all other aspects the double filament construction is identical with that previously described, and thereby permits a standardized lamp body or housing 110 to be utilized with a standardized bulb holder 140 to accommodate either a single and a double filament bulb, as desired.

In order to position the lamp 100 for accommodating different vehicles, a mounting base 160 is provided. The mounting base 160 comprises a horizontally extending base 161 formed with a plurality of holes 162 therein to accommodate suitable fasteners such as nuts and bolts or machine screws to facilitate mounting the base 160 to a suitable vehicle surface. A pair of upright support members 164 extend upwardly from the vertical support base 161 and at the upper end thereof are connected to the lamp housing 110 by a pair of knurled screws 166 to permit the vertical support members to be moved relative to the housing 110 to accommodate positioning of the lamp 100. A second pair of knurled screws 166 connects the bottom of the vertically extending support members 164 to the base support 161 to facilitate such positioning. While the base portion 161 may be permanently affixed to a portion of a vehicle 100, if it is desired to mount the lamp 100 in a temporary location or removed from the vehicle 10, a pair of suction cups (not shown) may be mounted to the base portion 161 and the wiring connections provided to the electrical contacts disclosed with reference to FIGS. 5 and 6 may be provided of such a sufficient length that the lamp 100 may be moved to positions remote from the vehicle 10 such as to a towed vehicle, or as a warning light for a long-load protruding from the rear of the vehicle. In this manner, the light may be electrically coupled to the vehicle electrical system, but physically mounted at a position removed from the vehicle.

While the invention has been described in the specification and illustrated in the drawings with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments illustrated by the drawings and described in the specification as the best modes presently contemplated for carrying out this invention, but that the invention will include any embodiments falling within the description of the appended claims.

What is claimed is:

1. An auxiliary lamp for use with a vehicle to perform lighting functions in response to a single or a double filament light bulb inserted therein comprising
    a lamp housing having a lens receiving opening formed therein for receiving a lens, and comprising closed top, side, bottom and rear walls forming a unitary enclosure, said bottom wall having a light-bulb holder receiving opening formed therein for receiving a light-bulb holder insertable therethrough,
    a lens positioned in said lens receiving opening in optical alignment with a light bulb positioned within said lamp housing upon insertion of a light-bulb holder means through said light-bulb holder receiving opening, and
    light bulb holder means for retaining a light bulb and positioning the light bulb in optical alignment with said lens positioned in said lens receiving opening,
    said light bulb holder means including a light bulb base engaging electrical contact to couple the light bulb engaged therewith to a source of electrical power,
    said light-bulb holder means further including retaining means releasably engageable with a portion of said lamp housing bottom wall which defines said light-bulb holder receiving opening for retaining said light-bulb holder means therein and thereby retaining a light bulb retained therein and positioned in optical alignment with said lens, and said light bulb base engaging electrical contact, entirely within said lamp housing.

2. The auxiliary lamp defined by claim 1 wherein said lens receiving opening formed in said lamp housing includes means formed on said lamp housing for releasably positioning a lens therein permitting various colored lenses to be interchangeably used in said opening.

3. The auxiliary lamp defined by claim 2 wherein said lens positioned in said lens receiving opening in said lamp housing includes means formed on said lens for engaging said means formed on said lamp housing to releasably secure said lens in said lens receiving opening.

4. The auxiliary lamp defined by claim 1 further including mounting means operatively connected to said lamp housing for selectively positioning the auxiliary lamp relative to a mounting surface.

5. The auxiliary lamp defined by claim 4 wherein said mounting means includes means for releasably securing said mounting means to a mounting surface for facilitating the temporary installation of the auxiliary lamp.

6. The auxiliary lamp defined by claim 1 wherein said light-bulb holder means closes said light-bulb holder receiving opening formed in said base portion of said lamp housing upon insertion of said light-bulb holder means therethrough.

7. The auxiliary lamp defined by claim 6 wherein said light-bulb holder means blocks out substantially all light from being emitted through said light-bulb holder receiving opening formed in said base portion of said lamp housing upon insertion of said light-bulb holder means therethrough.

8. The auxiliary lamp defined by claim 1 wherein said light-bulb holder means includes electrical coupling means for mutually exclusively coupling a source of electrical power to a single filament or a double filament light bulb selectively retained within said light-bulb holder means.

9. The auxiliary lamp defined by claim 8 wherein said light-bulb holder means includes two pairs of boss portions formed thereon for mutually exclusively retaining a light bulb therein.

10. The auxiliary lamp defined by claim 9 wherein each one of said pair of boss portions formed on said light-bulb holder means is adapted to have operatively connected thereto mutually exclusively said electrical coupling means for coupling a source of electrical power to a single filament or a double filament light bulb selectively retained by said light-bulb holder means.

* * * * *